July 22, 1930.  C. W. SHERMAN  1,771,320
SHOCK ABSORBER
Filed May 21, 1927   2 Sheets-Sheet 1
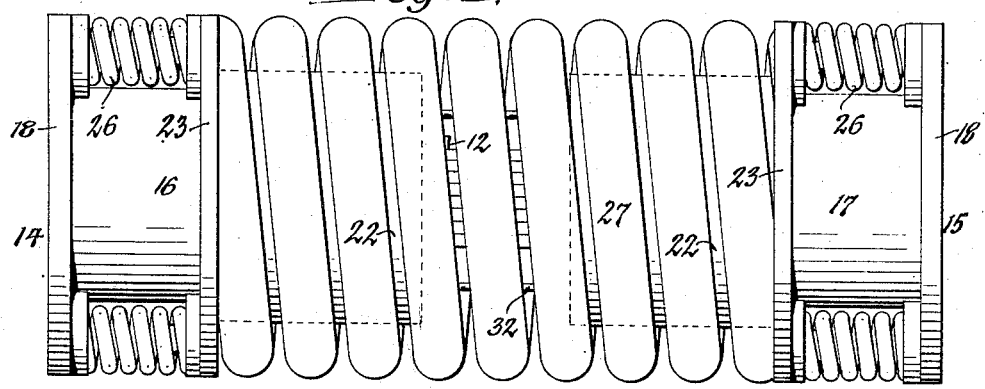
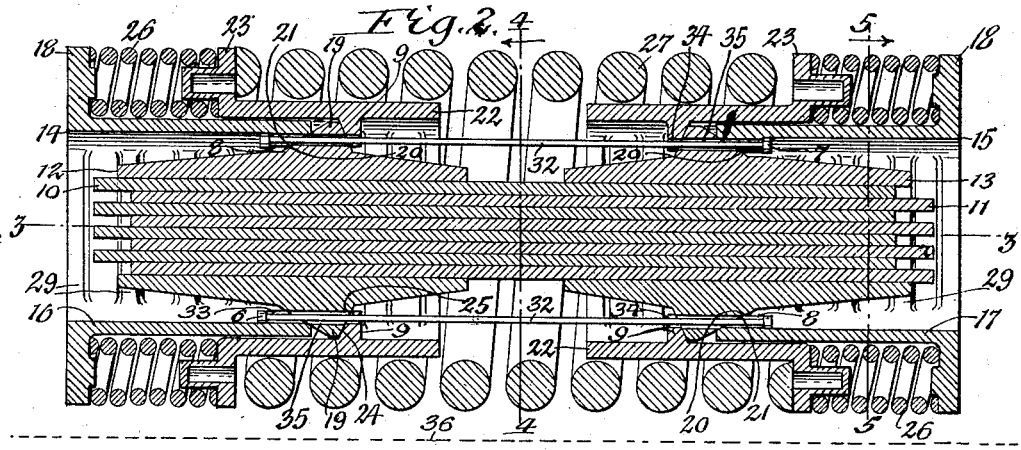
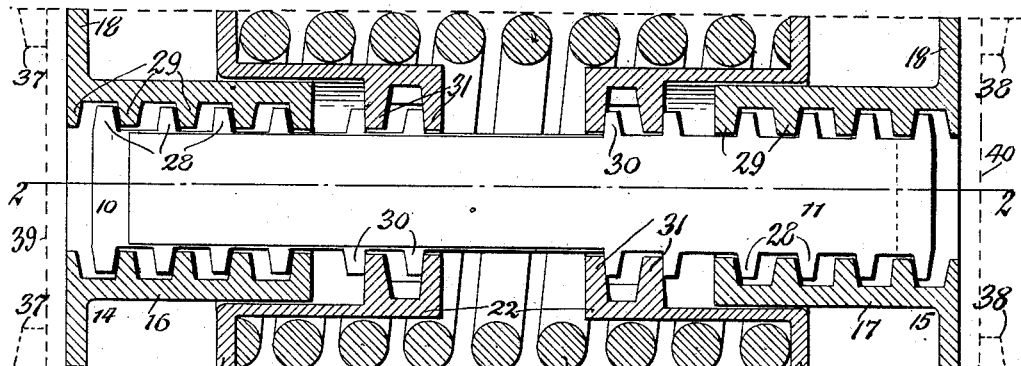

July 22, 1930. C. W. SHERMAN 1,771,320
SHOCK ABSORBER
Filed May 21, 1927   2 Sheets-Sheet 2
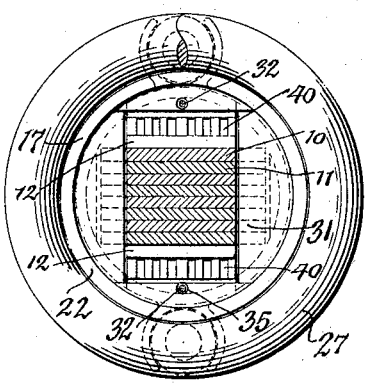
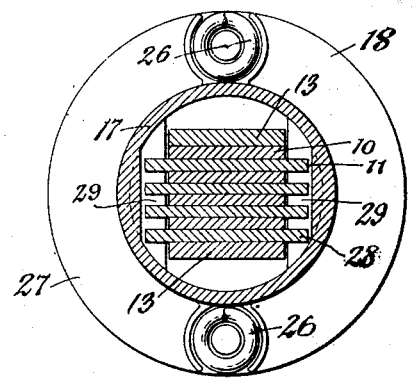
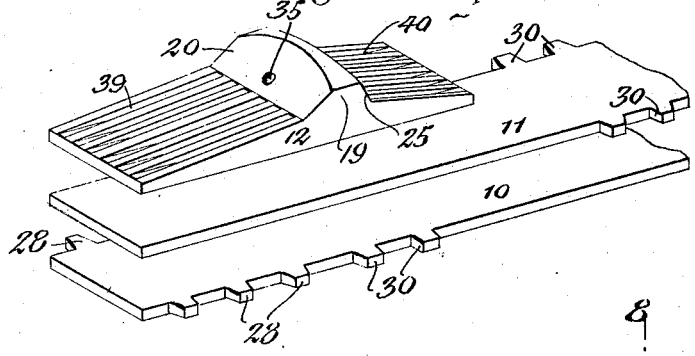
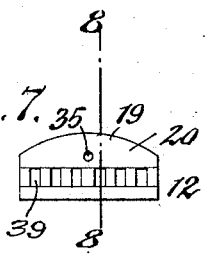
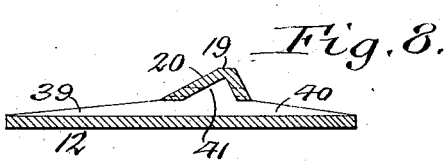

Patented July 22, 1930

1,771,320

UNITED STATES PATENT OFFICE

CLIFTON W. SHERMAN, OF HAMILTON, ONTARIO, CANADA, ASSIGNOR TO HALL DRAFT GEAR CORPORATION, OF BUFFALO, NEW YORK, A CORPORATION OF NEW YORK

SHOCK ABSORBER

Application filed May 21, 1927. Serial No. 193,328.

This invention relates to a shock absorber of the type in which a plurality of intercalated friction plates are employed in addition to a spring resistance for obtaining an increased shock absorbing capacity, this absorber being more particularly intended for use in railway cars although the same may also be used to advantage in other installations where very heavy shocks and loads require cushioning.

It is the object of this invention to provide a shock absorber of this character in which a greater area of contact between the plates is obtained and thereby increasing the frictional shock absorbing effect as well as avoiding the production of shoulders on the plates as the same become worn; also to improve the manner of guiding the several parts of the absorber relatively to the spring resistance; also to so organize the absorber that the load is transmitted from the housing to the plates by means of co-operating lugs on the side edges of the plates and the inner side of the housing to permit of sliding the ends of the plates past each other and thus wear uniformly; and also to so organize the absorber that the oversolid blows are carried through the cooperating lugs on the opposite edges of the plates and the wedging housing.

In the accompanying drawings:

Figure 1 is a side view of a shock absorber embodying my improvements. Figure 2 is a vertical longitudinal section of the same taken on line 2—2, Fig. 3. Figure 3 is a horizontal longitudinal section taken on line 3—3, Fig. 2. Figures 4 and 5 are vertical transverse sections taken on the correspondingly numbered lines in Fig. 2. Figure 6 is a perspective view of one of the pressure shoes and a pair of co-operating friction plates. Figure 7 is an end view of one of the pressure shoes. Figure 8 is a longitudinal section of one of the pressure shoes taken on line 8—8, Fig. 7.

Similar characters of reference indicate like parts in the several figures.

The numerals 10 and 11 represent a plurality of metal friction plates arranged to form two sets or groups which are intercalated and adapted to slide with their flat sides or faces lengthwise in engagement with one another. For convenience in description in the present case, the group of plates 10 will be regarded as the front set and the group of plates 11 as the rear set.

On opposite flat sides of this pack of friction plates and at opposite ends thereof the same are engaged by the flat inner sides of pressure shoes 12, 13, the shoes 12 engaging opposite sides of the front end of the pack of plates and the shoes 13 engaging opposite sides of the rear end of this pack.

Surrounding the front and rear ends of the pack of plates and the outer ends of the respective shoes are front and rear main followers 14, 15, the bodies 16, 17 of which are preferably constructed in the form of tubular housings each of which is provided at its outer end with a laterally projecting flange 18 and the inner end of which has a wedging engagement with the pressure shoes at the respective end of the pack of plates. This wedging engagement is preferably obtained by providing each shoe on its outer side with a transverse rib 19, the front side of which has an inclined face 20 which engages with an inclined face 21 on a rib 8 on the adjacent part of the respective main follower.

The inner end of each main follower and the inner ends of the corresponding friction shoes and the adjacent parts of the pack of plates are enclosed by a spring follower 22 which is preferably of tubular form and provided at its outer end with a laterally projecting flange 23 and adjacent to its inner end with a rib 9 having an outward facing incline 24 which engages with an incline 25 on the inner side of the rib of the shoe on the corresponding end of the pack of friction plates.

Between each main follower and the companion spring follower is arranged a releasing spring resistance consisting preferably of two comparatively light releasing springs 26 arranged on opposite sides of the respective main follower and bearing with their outer and inner ends against the flanges 18 and 23 at the outer ends of these followers, as shown in Figs. 1 and 2. The main spring resistance of the absorber consists preferably of a heavy helical spring 27 surrounding the central part of the pack of friction plates and the inner ends of the followers and shoes and bearing with its opposite ends against the inner sides of the flanges 23 on the spring followers.

On the outer part of the edges of the friction plates the same are provided with means for coupling the same with the respective main followers so as to compel these members at times to move together lengthwise and at other times to move lengthwise independently of one another. These coupling means preferably consist of a longitudinal row of outer coupling lugs 28 projecting laterally from the outer longitudinal edge portions of each set of friction plates and adapted to engage with longitudinal rows of main coupling lugs 29 on the inner side of the respective main follower and a plurality of inner coupling lugs 30 projecting laterally from the inner longitudinal parts of the edges of the friction plates and adapted to engage with a plurality of auxiliary restoring or releasing coupling lugs 31 arranged in longitudinal rows on the inner side of the respective spring follower.

The spacing between the lugs of the friction plates and those on the main and spring followers is such that a loose-fit or slack space is formed between the co-operating lugs.

It is to be noted that inclines on the outer sides of the ribs of both shoes of each pair and the co-operating inclines on the opposing parts of the main follower converge outwardly and the inclines on the inner sides of the ribs of both shoes of each pair and the co-operating inclines on the adjacent spring follower converge inwardly.

Separation of the main followers, spring followers, pressure shoes and friction plates under the action of the main and release springs is limited when the gear is not mounted in a railway car by tie rods 32 passing lengthwise through openings 33, 34, 35, in the ribs 8, 9, 19, of the main and spring followers and the pressure shoes and having inwardly facing shoulders 6 and 7 thereon formed by the heads and nuts thereon which engage with outwardly facing shoulders formed by the outer sides of the ribs 8 on the main followers, as shown in Fig. 2.

This shock absorber may be mounted in a railway car in any suitable manner but preferably between two longitudinal sills 36 which form part of the car body and which are provided with front and rear stops 37, 38, and front and rear auxiliary followers 39, 40 interposed between the front and rear stops 37, 38 and the outer ends of the main front and rear followers in the fully expanded condition of the gear, as shown in Fig. 3.

The operation of the shock absorber is as follows: In the fully released or expanded condition of the gear the front and rear auxiliary followers engage their outer sides with the front and rear stops of the car sills, the outer ends of the main followers engage the inner sides of the auxiliary followers, and the outer faces of the coupling lugs on the main and spring followers engage with the inner faces of the coupling lugs on the friction plates, which latter are withdrawn into their outermost position, as shown in Figs. 2 and 3. Assuming that the shock absorber is subjected to a buffing action by which the front main follower is moved toward the rear main follower, the first effect is to move the front main follower inwardly independently of the friction plates until the inner sides of the lugs 29 on the front main follower engage with the outer sides of the lugs 28 on the front set of friction plates 10, thereby taking up the slack between these followers and these plates, and at the same time increasing the compression of the release springs, and also causing the front pressure shoes to increase the transverse pressure against opposite sides of the front end of the pack of plates due to the wedging engagement between the main front follower and the front shoes. During the continued inward movement of the front main and auxiliary followers the two sets of friction plates move rearwardly therewith until the outer sides of the coupling lugs 28 on the rear set of friction plates engage the inner sides of the coupling lugs 29 on the rear main follower and then the further rearward movement of the rear set of plates is arrested and at the same time motion is transmitted from the front spring follower by the main spring to the rear spring follower and the rear shoes so that the latter, due to the wedging engagement with the rear main follower, will increase the transverse pressure against opposite sides of the pack of friction plates at the rear end thereof.

The two sets of friction plates now engage each other under increased transverse pressure over their entire co-operating flat sides and therefore exert greater frictional resistance to the load which is acting to shift the front plates longitudinally rearwardly relatively to the rear set of plates and thereby absorb shock accordingly in addition to that which is absorbed by the capacity of the main and release springs.

On releasing the load on the main followers, the first effect is that the wedging members will be moderately released, and this action will relieve the wedging pressure, thereby permitting the main spring to act. This release of the gear is also assisted by the auxiliary release springs. This permits the main spring to expand and move the front shoes forwardly and also permits the rear release springs to push the rear spring follower forward so as to reduce the wedging engagement of the rear shoes with the rear main follower and relieve the transverse inward pressure of the rear shoes against opposite sides of the rear end of the pack of friction plates. After the front main follower has effected its initial forward movement independently of the friction plates the outer sides of its coupling lugs 29 engage the inner sides of the coupling lugs 28 on the front set of friction plates and causes the latter to be also moved forwardly with the front main follower. As the front set of plates effect the initial part of their forward movement the frictional contact between the same and the rear set of plates causes the latter to be also moved forwardly until the inner side of the coupling lugs 28 on the rear set of plates engage with the outer side of the coupling lugs 29 on the rear main follower. After this the rear set of plates remains stationary while the front set of plates continues its forward movement with the front main follower, thereby causing the front set of plates to be pulled forwardly away from the rear set of plates under sufficient frictional resistance to prevent unduly rapid release of the gear. If the plates should stick together and not release promptly or be retarded by virtue of the combined frictional grip between the pressure shoes and friction plates resisting the return movement of the main spring, then the release springs operate solely to relieve the wedge action of the main followers on the pressure shoe angles, and when this wedging pressure is relieved the main spring will open the gear. The main thrust spring which has a capacity greater than the capacity of the several release springs will cause the front set of plates to be drawn forwardly from the rear set of plates by engagement of the outer sides of the restoring coupling lugs 31 on the front spring follower with the inner sides of the releasing lugs 30 on the front set of plates, during which movement the front spring follower which is acted on by the main spring not only exerts a forward pull on the front plates but also pushes the front shoes forwardly due to engagement of the outer side of the ribs 9 on the front spring follower with the inner side of the ribs 19 on the front pair of shoes. This expanding action of the gear continues until the front auxiliary follower again engages with the front stops of the sills at which time the gear is again restored to its normal position.

The return action of the main spring is retarded by the frictional resistance on the shoes through the angle of repose of the cooperating faces on the shoes and spring follower and by virtue of the fact that a pack of intercalated plates will resist the return movement until the wedging pressures are almost entirely relieved by the follower sliding off the angles of the pressure shoes or assisted by the release springs.

Whenever the gear is subjected to a pulling action the rear main and auxiliary followers are moved forwardly toward the front main and auxiliary followers and the action above described is repeated excepting that the movement of the corresponding parts is reversed in an obvious manner.

This construction gives an improved application of pressure distribution over the whole body of frictional plates resulting in a more even wear without developing taper. Each opposing plate travels past the opposite end of the adjacent plate and therefore avoids tapering wear on the plates or the production of any positive shoulders thereon. This feature is incident to carrying the draft loads on the lugs of the plates and housing as shown, allowing them to slide completely past each other with a telescopic action and by applying pressures relatively nearer to the center of the plates.

This construction also brings the bearing of the main spring nearer to the outer ends of the gear and in that way avoids a certain amount of tilting action incident to a double-ended draft gear supported on a short spring. Such an application of spring pressures to the housings or followers at either end results in a better alinement and less wear on the housings from an edgewise movement of the plates. Moreover, this organization of the several parts produces a distribution of the pressure over the entire area of the friction plates, resulting in uniform wear and lengthening the life of the gear before losing the wedging pressures and clearances necessary for its most effective working.

At the point of initial compression of the main spring the capacity may be in excess of the final capacity of the release spring. In other words, the main spring can have an initial compression of 10 or 12 inches and still leave 2¾ or 3 inches stroke in the gear.

It must be borne in mind that capacities in multiple frictional element gears are multiplied in direct ratio to pressure applied to any part by the number of parts. Also that the release movement of a similarly constructed gear is retarded in the same manner, therefore, the relieving of wedge pressure must be positive and it is positive in this construction. In other words, the capacity of the main spring, which is much greater than the release springs, is retarded by the frictional capacity of the gear itself and helps accomplish positive release.

It will be observed that the bearing action of the outer lugs 29 of the main followers is transferred from the inward to the outward sides of the same and that the outer lugs on the plates are used both for pushing the plates in and for pulling the same back, but the lugs which are engaged by the spring followers are only used for pulling the plates back upon release. The outward movement of the plates is effected principally by the main spring aided by the release spring and also aided by the relief of wedging pressure from the release spring acting outwardly.

It has been found desirable to use heat treated cast steel for friction shoe purposes and in order to thoroughly and uniformly harden this cast steel it is desirable to have uniform sections. Experience has also shown that cross coring in the shoe is undesirable and permits it to collapse. Therefore, a shoe has been designed with the two ideas of supporting a load on a series of ribs and maintaining a uniform section of metal.

A shoe having this capacity and shown more particularly in Figs. 6, 7 and 8, is provided with a plurality of longitudinal channels arranged parallel on the shoe and having its end portions 39, 40 opening through the outer side of the shoe in front and in rear of the rib 19 thereof while the central parts of these channels extend through the rib on the respective shoe and form enlarged pockets 41 within this rib below the outer surface thereof.

The body of plates 10, 11 together form a laminated plate structure which under pressure in the closed condition of the gear possesses a large capacity for taking oversolid blows, this being due to making the plates 10, 11 of such length that in the fully closed position of the gear the plates bear at their opposite ends against the auxiliary followers and thus produce in effect a solid column in the center of the gear.

This construction of shoe has a greater resistance to bending than one having a cross coring.

I claim as my invention:

1. A shock absorber comprising a plurality of sets of intercalated friction plates, follower means, coupling means adapted to connect said plates at their side edges only with said follower means and cause said plates and followers to move longitudinally inwardly and outwardly together without engaging the plates at their ends; transverse pressure creating means for pressing said plates together, and a spring resistance and said structure being organized to enable the plates to pass beyond one another.

2. A shock absorber comprising a plurality of sets of intercalated friction plates which are movable lengthwise relatively to one another, follower means adapted to move at times with said plates and at other times independently of said plates, coupling means arranged between the side edges only of said plates and said follower means for causing said plates and follower means to move longitudinally inwardly and outwardly without engaging the plates at their ends; means for pressing the plates together transversely; and a spring resistance and said structure being organized to enable the plates to pass beyond one another.

3. A shock absorber comprising a plurality of sets of intercalated friction plates which are movable lengthwise relatively to one another, follower means movable one relatively to another lengthwise of the friction plates, means for coupling said follower means and plates comprising coupling lugs arranged on the longitudinal edges of said plates and coupling lugs arranged on said follower means and interposed between said lugs on the plates said follower means being incapable of engaging the ends of said plates; means for pressing said plates together transversely and a spring resistance and said structure being organized to enable the plates to pass beyond one another.

4. A shock absorber comprising a plurality of sets of intercalated friction plates which are movable lengthwise relatively to one another, follower means movable one relatively to another lengthwise of the friction plates, means for coupling said followers and plates comprising coupling lugs arranged on the longitudinal edges of said plates and coupling lugs arranged on said follower means and interposed between said lugs on the plates, said follower means being incapable of engaging the ends of said plates; means for pressing said plates together transversely, and a spring resistance and said structure being organized to enable the plates to pass beyond one another.

5. A shock absorber comprising a plurality of sets of intercalated friction plates which are movable lengthwise relatively to one another, follower means movable one relatively to another lengthwise of the friction plates, means for coupling said followers and plates comprising coupling lugs arranged on the longitudinal edges of said plates and coupling lugs arranged on said follower means and interposed between said lugs on the plates, the opposing surfaces of the lugs on said follower means and said friction plates being spaced apart to permit of a limited independent movement of said follower and means and friction plates lengthwise relatively to one another, said follower means being incapable of engaging the ends of said plates; means for pressing said plates together transversely; and a spring resistance and said structure being organized to enable the plates to pass beyond one another.

6. A shock absorber comprising a plurality of sets of intercalated friction plates which are movable lengthwise relatively to one another, follower means movable relatively to one another lengthwise of said plates, means for transmitting motion from said follower means to said plates and causing the ends of the latter to move lengthwise past one another, said follower means being incapable of engaging the ends of said plates; means for pressing said plates together transversely; and a spring resistance.

7. A shock absorber comprising a plurality of sets of intercalated friction plates movable lengthwise relatively to one another, main follower means adapted to be coupled with said plates and to move lengthwise therewith, spring followers having inwardly projecting releasing lugs, releasing lugs projecting outwardly from said friction plates and adapted to be engaged by the lugs on said spring followers, said follower means being incapable of engaging the ends of said plates; means for pressing said plates together transversely; and a spring resistance engaging said spring followers.

8. A shock absorber comprising a plurality of sets of intercalated friction plates movable lengthwise relatively to one another, main follower means adapted to be coupled with said plates and to move lengthwise therewith, spring followers having inwardly projecting releasing lugs, releasing lugs projecting outwardly from said friction plates and adapted to be engaged by the lugs on said spring followers, means for pressing said plates together transversely; a spring resistance engaging said spring followers, and co-operating coupling lugs arranged between the side edges of said friction plates and said main follower means for causing said plates and main followers at times to move inwardly and outwardly lengthwise of the plates said follower means being incapable of engaging the ends of said plates.

9. A shock absorber comprising a plurality of sets of intercalated friction plates which are movable lengthwise relatively to one another, main followers movable toward and from one another lengthwise of said plates, pressing means interposed between said main followers and plates for pressing said plates together transversely, spring followers co-operating with said pressing means, a main spring resistance interposed between said spring followers, and a releasing spring means interposed between said main followers and spring followers.

10. A shock absorber comprising a plurality of sets of intercalated friction plates which are movable lengthwise relatively to one another, main followers movable toward and from each other lengthwise of said plates, means for transmitting longitudinal motion from said main followers to said plates, pressing means for pressing said plates together transversely, spring followers surrounding the main follower means and co-operating with said pressing means and having shoulders arranged between the inner and outer ends of said main followers and outwardly beyond said pressing means and thus providing a long space for a main spring resistance; and a main spring resistance engaging with the shoulders of said spring followers.

11. A shock absorber comprising a purality of sets of intercalated friction plates movable lengthwise relatively to one another, main followers movable toward and from each other lengthwise of the plates, and pressure means for pressing said plates together transversely including shoes engaging said plates and provided on their outer sides with wedge portions and longitudinal channels extending through said wedge portions and opening at their ends.

12. A shock absorber comprising a plurality of sets of intercalated friction plates movable lengthwise relatively to one another, main followers movable toward and from each other lengthwise of the plates, and pressure means for pressing said plates together transversely including shoes engaging said plates and each provided on its outer side with a transverse rib and a plurality of longitudinal channels which extend through said rib and have their end portions opening outwardly on opposite sides of said rib and their central parts enlarged to form pockets within said rib.

In testimony whereof I hereby affix my signature.

CLIFTON W. SHERMAN.